C. A. PETTERSON.
WRAPPING MACHINE.
APPLICATION FILED MAR. 30, 1915. RENEWED FEB. 6, 1918.

1,300,189.

Patented Apr. 8, 1919.
10 SHEETS—SHEET 5.

WITNESSES
A. H. Kephart
Léon Boillot

INVENTOR
C. A. PETTERSON
Carlos P. Griffin
ATT'Y.

C. A. PETTERSON.
WRAPPING MACHINE.
APPLICATION FILED MAR. 30, 1915. RENEWED FEB. 6, 1918.
1,300,189.
Patented Apr. 8, 1919.
10 SHEETS—SHEET 6.
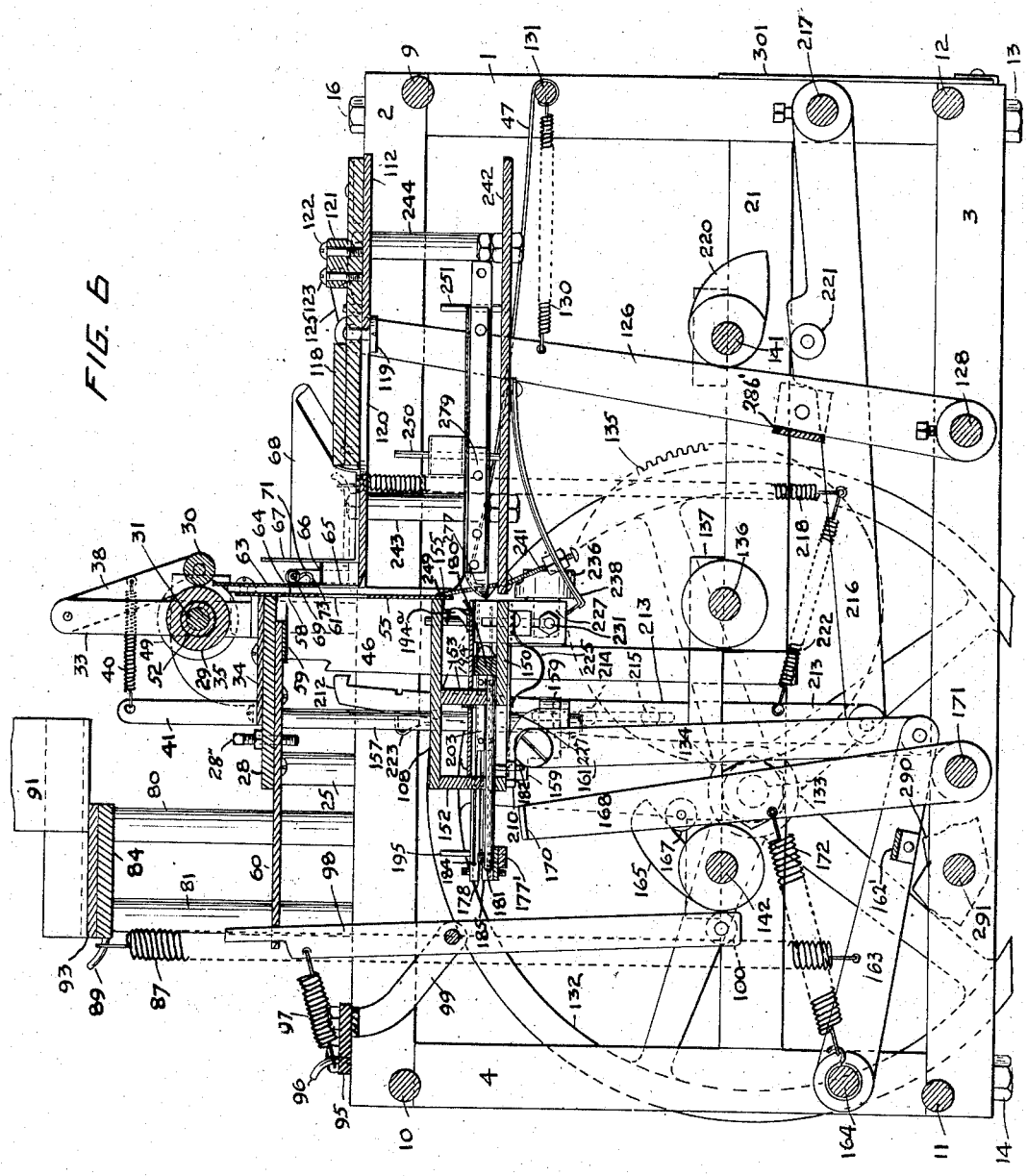
WITNESSES
INVENTOR
C. A. PETTERSON

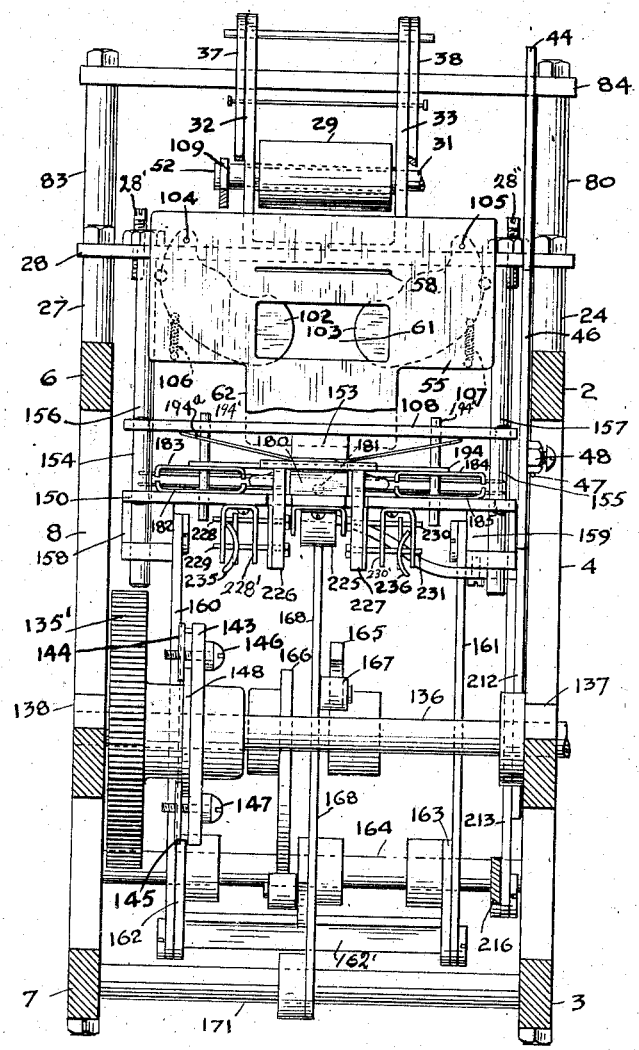

C. A. PETTERSON.
WRAPPING MACHINE.
APPLICATION FILED MAR. 30, 1915. RENEWED FEB. 6, 1918.
1,300,189.
Patented Apr. 8, 1919.
10 SHEETS—SHEET 8.
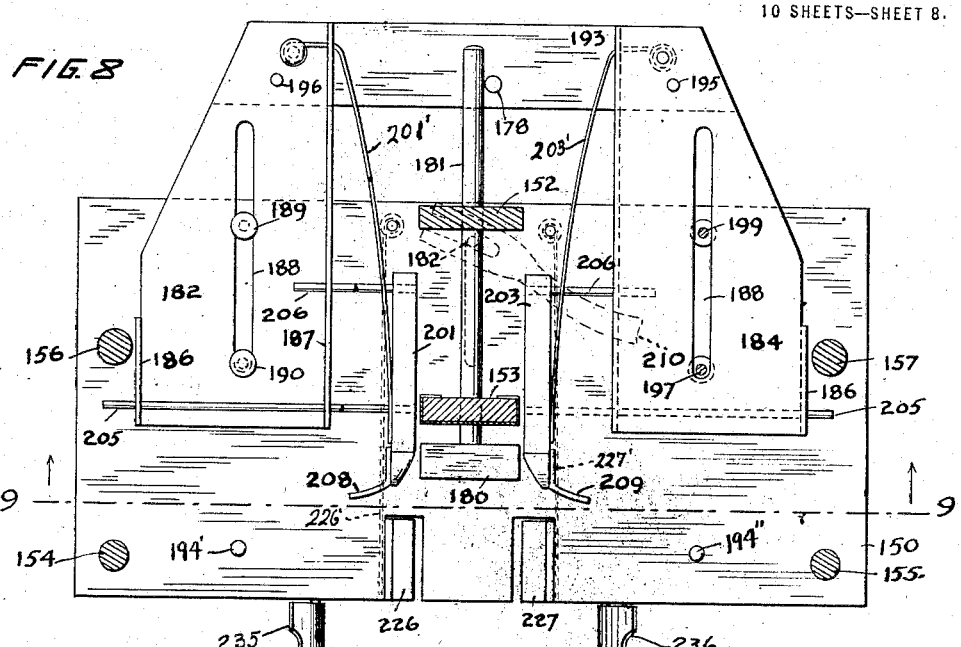
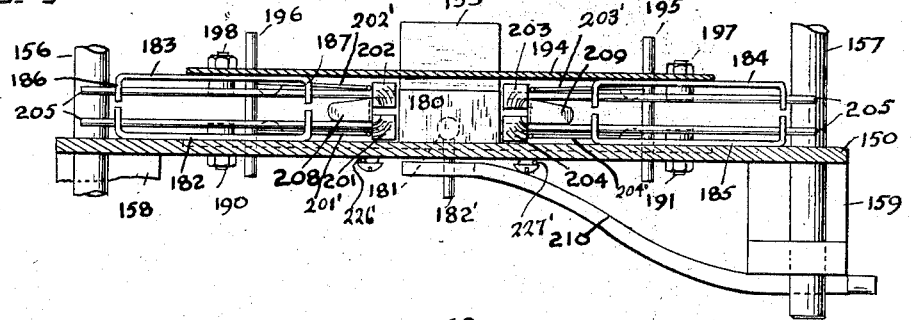
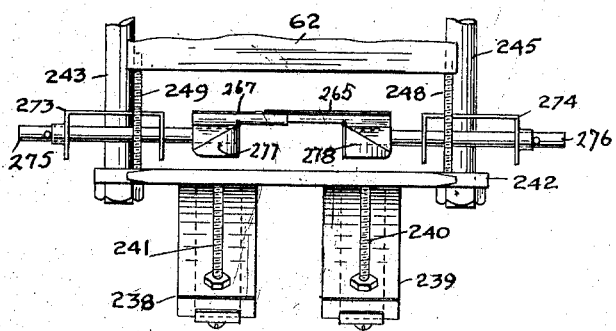
WITNESSES
INVENTOR
C. A. PETTERSON
Carlos P. Griffin
ATT'Y

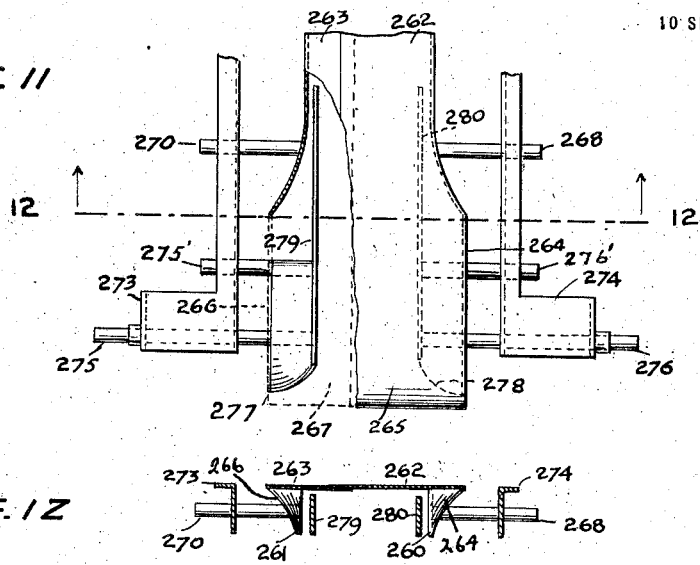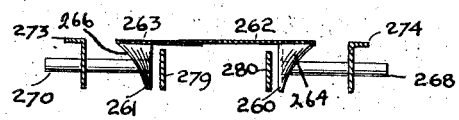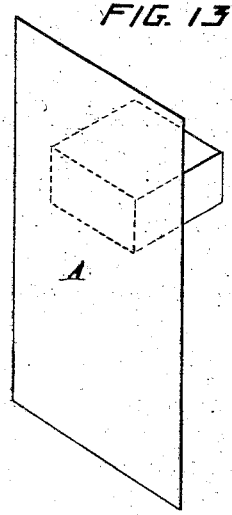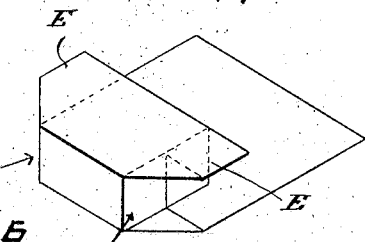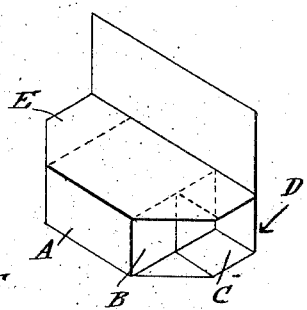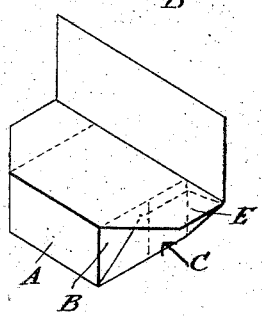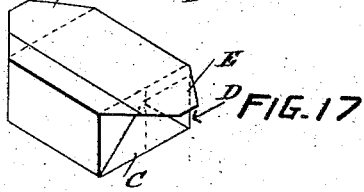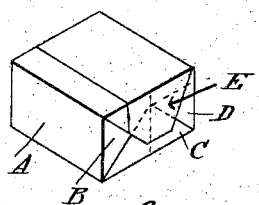

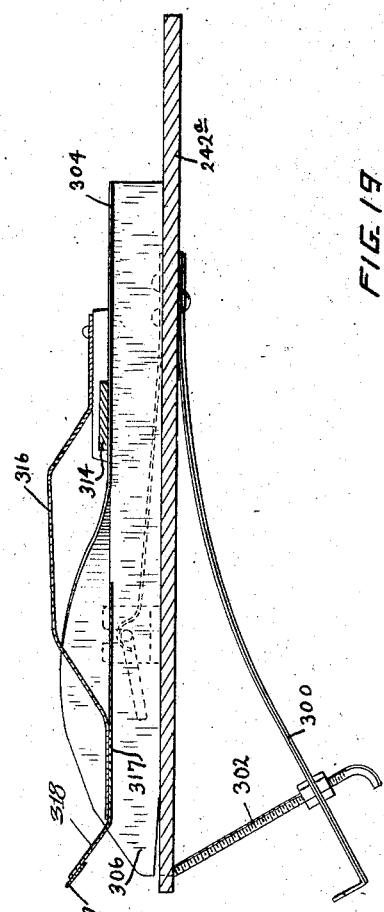
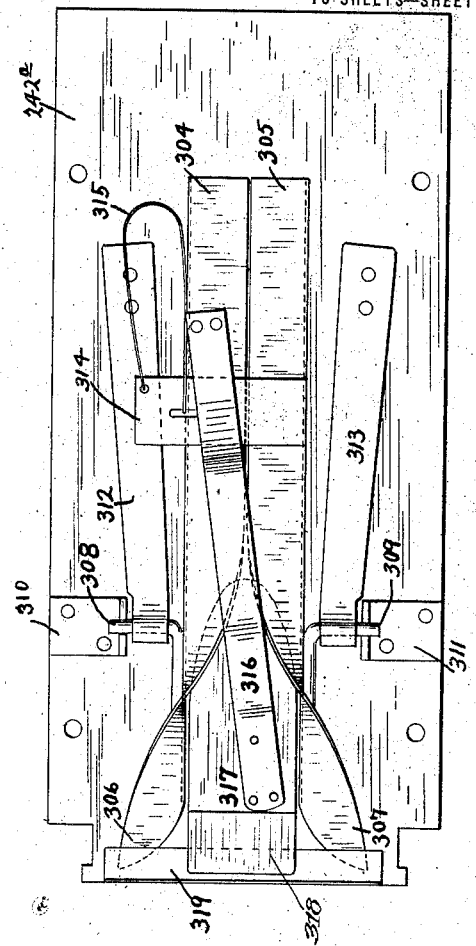
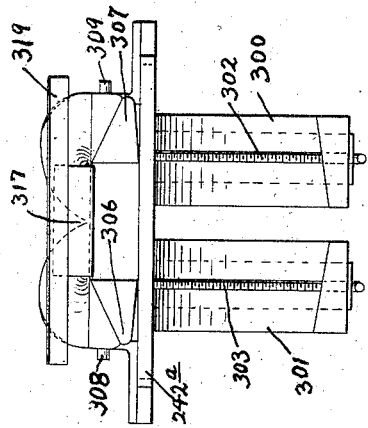
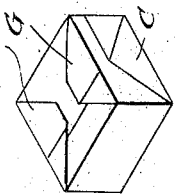

UNITED STATES PATENT OFFICE.

CLARENCE A. PETTERSON, OF SAN FRANCISCO, CALIFORNIA, ASSIGNOR TO NATHAN SCHILLER, OF SAN FRANCISCO, CALIFORNIA.

WRAPPING-MACHINE.

1,300,189.   Specification of Letters Patent.   Patented Apr. 8, 1919.

Application filed March 30, 1915, Serial No. 18,190. Renewed February 6, 1918. Serial No. 215,919.

*To all whom it may concern:*

Be it known that I, CLARENCE A. PETTERSON, a citizen of the United States, residing at San Francisco, in the county of San Francisco, State of California, have invented a new and useful Wrapping-Machine, of which the following is a specification, in such full and clear terms as will enable those skilled in the art to construct and use the same.

This invention relates to a machine for wrapping paper around an object such as a caramel or box depending upon the size of the machine.

An object of the invention is to provide a wrapping machine capable of wrapping objects of different sizes, the machine being automatically adjustable throughout a wide range of the size of the object to be wrapped.

The machine illustrated is used for wrapping square caramels and it is capable of taking a caramel from three-eighths of an inch by one-half an inch square to as large as three-quarters of an inch in each dimension, thereby giving an adjustment of about 50% in each direction.

Another object of the invention is to provide means whereby the paper will not be paid out unless a caramel or other object has been pushed into the wrapping machine. This not only economizes in the use of the paper, but prevents the paper from accumulating about the folding mechanism and thereby interfering with the folding operations.

Another object of the invention is to provide means whereby the folding operations will take place in such sequence as to insure the proper operation of the machine and the folding of the package or parcel.

Other objects of the invention will appear as the description proceeds.

An embodiment of the invention is shown in the drawing in which the same reference numeral is applied to the same portion throughout, but I am aware that there are many modifications thereof, Figure 1 is a plan view of the complete machine the paper roll being omitted for purposes of illustration, Fig. 2 is a side elevation of the complete machine looking from the bottom of Fig. 1, only a portion of the paper roll being shown, Fig. 3 is a side elevation of the machine looking from the top of Fig. 1 only a portion of the paper roll being shown, Fig. 4 is a front elevation of the machine looking from the left of Fig. 1, Fig. 5 is an elevation of the machine looking from the right of Fig. 1, Fig. 6 is a longitudinal sectional view of the machine on the line 6—6, Fig. 1, Fig. 7 is a transverse vertical sectional view of the machine on the line 7—7 Fig. 3, looking in the direction of the arrow, the driving pulley and driving gears being omitted, Fig. 8 is a plan view of the wrapping carriage, one of the folding members being omitted therefrom for purposes of illustration, Fig. 9 is a view of the wrapping carriage looking in the direction of the arrows 9, 9 Fig. 8 on the plane indicated by the dotted line, Fig. 10 is a view in elevation of the final folding chute, Fig. 11 is a plan view of a portion of the final folding chute, parts thereof being broken away for purposes of illustration, Fig. 12 is a vertical sectional view of the final chute on the line 12—12, Fig. 11, Fig. 13 is a perspective view of the appearance of the candy and piece of paper when the candy is in the first position ready to be pushed into the movable folding carriage, Figs. 14 to 18 inclusive are perspective views showing the successive steps in folding the paper around a portion of the candy.

Fig. 19 is a plan view of a modified form of final folding chute,

Fig. 20 is a sectional side elevation of the chute shown in Fig. 19,

Fig. 21 is a front elevation of the chute shown in Fig. 19, and

Fig. 22 illustrates the way the folded package looks after leaving the chute shown in Figs. 19 to 21.

Figure 1:
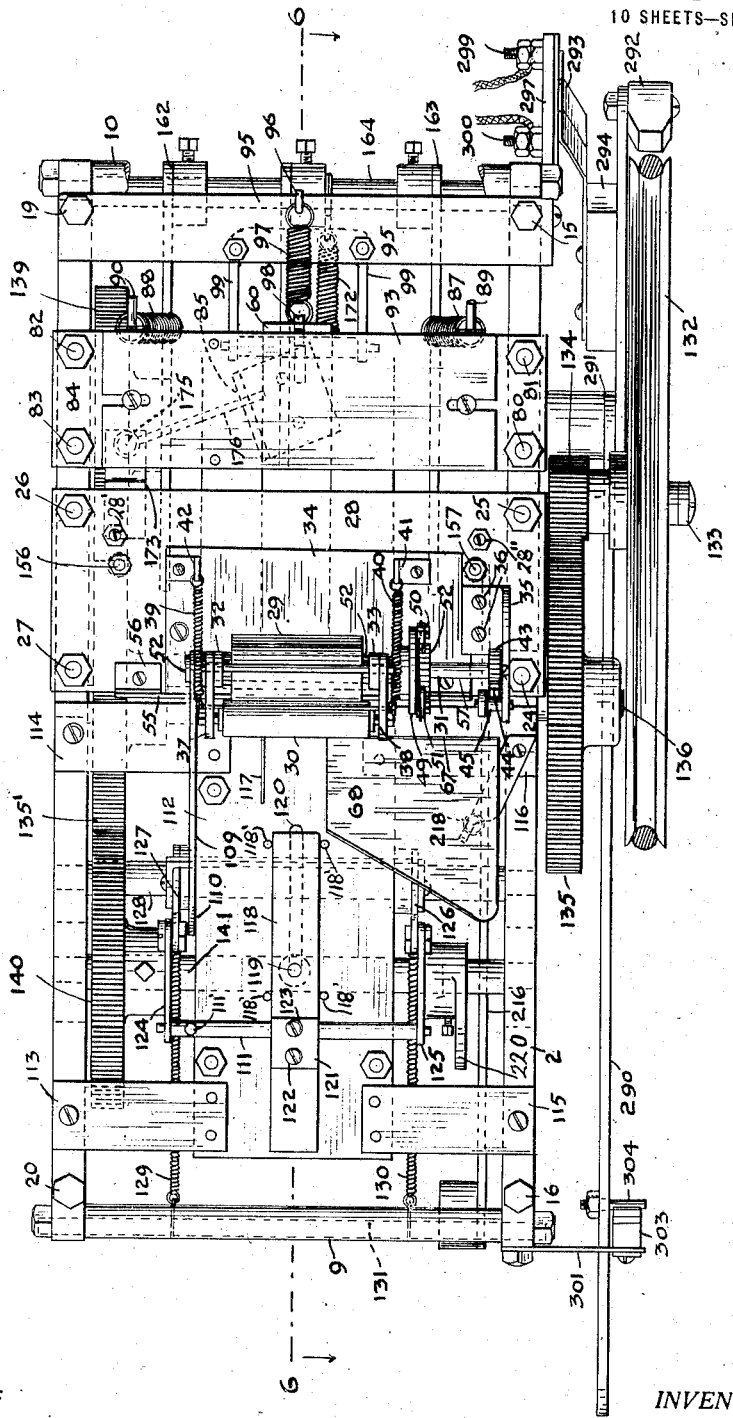

The machine comprises two vertically extending side frames having members 1 to 8 inclusive, which frames are suitably secured by means of horizontally extending bolts 9 to 12 inclusive. The frame members are secured together by means of a plurality of cap screws 13 to 20 inclusive. Each side frame also supports a longitudinally extending bar as shown at 21 and 22, said bars also supporting the principal driving shafts of the machine.

At the top of the machine there are four short posts 24, 25, 26 and 27 supporting a transversely extending plate 28, which plate affords a support for the paper feed rolls 29 and 30. The roll 29 is mounted on a shaft 31, which shaft extends through two posts 32 and 33 secured on the top of the plate 28, a second or reinforcing plate 34 directly carrying said posts and also having an upwardly projecting and forwardly extending post 35 at the end thereof, the latter post being secured by means of screws 36 to the plate 28.

Figure 2:
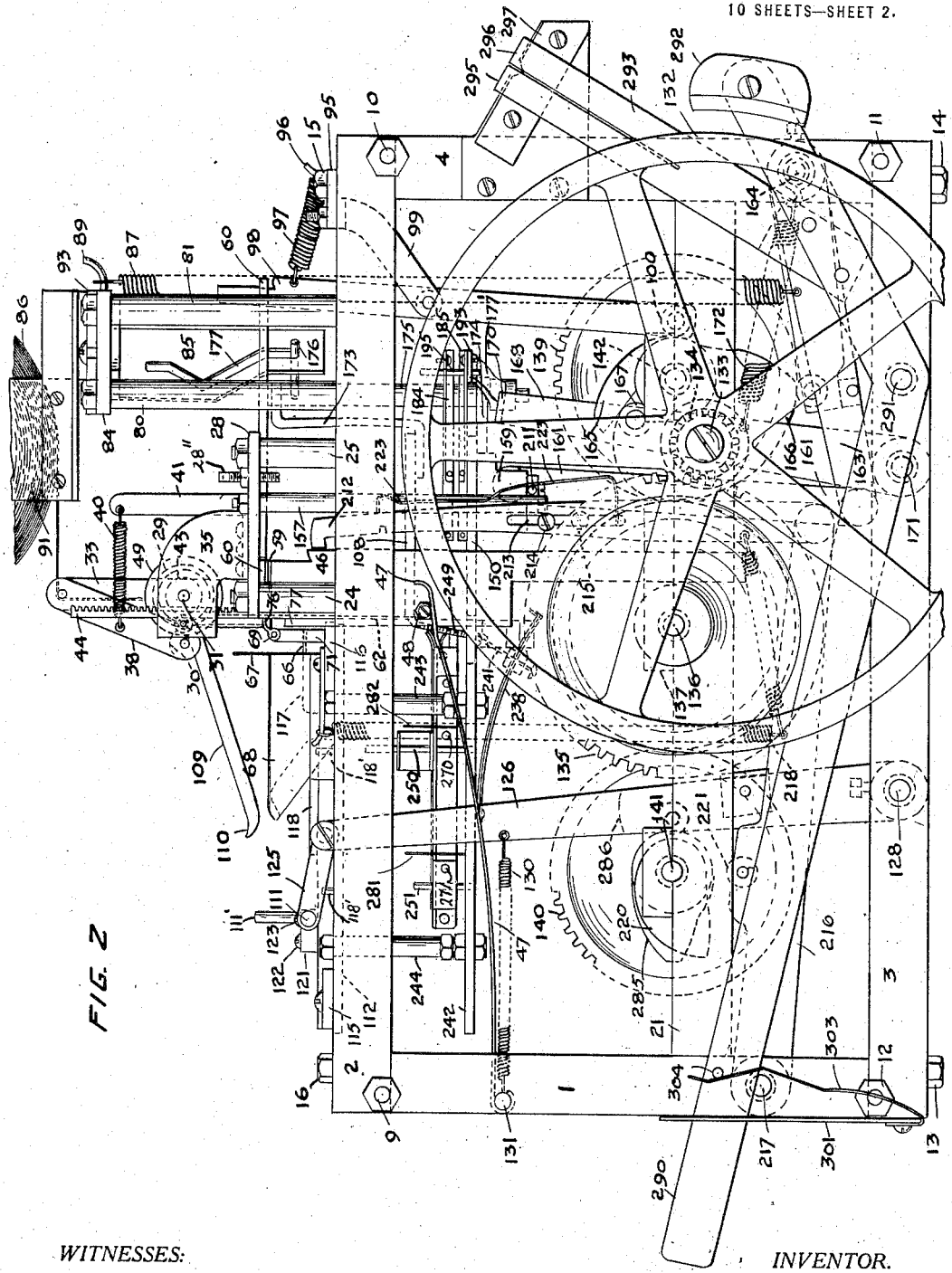

Pivoted to the top of the posts 32 and 33 are two links 37 and 38 which links support the pressure roll 30 which is held in contact with the roll 29 by means of the spiral springs 39 and 40, which are connected at their opposite ends to the posts 41 and 42. The shaft 31 is journaled in the posts 33 and 32 and 35 and it has a spur gear 43 thereon in mesh with a rack 44 for the operation thereof. The rack 44 is held in engagement with the gear 43 by means of a small flanged roller 45 and it is secured to the top of the slide 46, which slide is held normally in the position indicated in Fig. 2 by means of a suitable spring 47 bearing on a stud 48 on the side of the slide.

The shaft 31 has a flanged disk 49 mounted thereon which is secured to a sleeve 52 which carries the feed roll 29. The flanged disk has two spring operating pawls 50 and 51 which bear upon a ratchet wheel 52' secured to the shaft 31. The object of this construction is to rotate the feed roll 29 to draw the paper downwardly whenever the caramel has been fed into the machine.

It is to be noted that the feed mechanism and post 35 are mounted on top of the plate 34 so that when it is desired to remove those parts all that is necessary is to separate that plate from the plate 28 by taking out a pair of screws.

Immediately in front of the plate 34 there is a vertically extending plate 55, which is secured to the plate 28 by means of suitable flanges 56 and 57. This plate extends downwardly below the plate 28 and has a slot 58 therethrough for the knife 59 to pass through, said knife being carried on a slide 60. Below the knife slot 58 there is an opening 61 in the plate 55 for the wrapper and caramel to pass through, said plate having a depending portion 62 to cause one side of the wrapper to be folded up against the edge of the caramel.

Secured in front of the plate 55 is a plate 63 which has a slot 64 to permit the knife blade 59 to pass through when the paper is to be cut. This plate 63 also has a hole 65 through which the caramel is pushed and it has a forwardly projecting chute 66 which abuts against the vertically extending wall 67 of the inclined feed table 68. The plates 55 and 63 are far enough apart to permit the sheet of paper to pass between them and in order to hold the bit of paper required to wrap the parcel a shaft 69 mounted on posts 70 and 71 in front of the plate 63 is provided with a pair of fingers 72 and 73 which project through openings 74 and 75 below the slot 64. This shaft has a finger 76 thereon which contacts with a cam at 77 on the rack bar 44 to cause the release of the fingers, a small spiral spring 78 holding said fingers engaged with the paper when the cut has been made.

At the back of the plate 28 four posts 80, 81, 82 and 83 support a plate 84 which extends transversely across the machine and affords a support for the cam plate 85, the paper feed roll 86 and springs 87 and 88 which lift the wrapper carriage. The springs 87 and 88 have their upper ends passed over the hooks 89 and 90 connected with the plate 84. The paper feed roll 86 is carried by two vertically extending plates 91 and 92 secured on a plate 93 which in turn is attached to the plate 84. The plate 92 is removable by the removal of the thumb nut 94 to enable a fresh roll of paper to be inserted in place.

At the back of the machine there is a transversely extending plate 95 having a hook 96 thereon to which the spring 97 is connected, the opposite end of said spring being connected with a lever 98 which operates the knife slide 60. The lever 98 is supported by an arm 99 secured to the underside of the plate 95 and at the lower end of the lever 98 there is a roller 100 against which the operating cam bears.

In order to prevent the paper from accidentally passing through the opening 61 the plate 55 has two thin wings 102 and 103 pivoted thereon at 104 and 105, said wings being held in the position illustrated in Fig. 7 by means of small spiral springs 106 and 107. The wings are also provided with backwardly extending lugs with which the plate 108 of the folding carriage contacts when it rises, the object being to move the wings away from the hole 61 when the caramel and paper are pushed therethrough by the feeding plunger. The plate 28 carries set screws 28' and 28" which are fixed in position by suitable lock nuts to determine the precise upward throw by contacting with the plate 108 of the folding carriage.

In order to prevent the paper from being wasted the feed roller does not pull the paper down unless the object has been pushed into the folding carriage, but in order to prevent the edge of the paper from being repeatedly touched by the knife 59 after one piece has been cut off, a lever 109 is frictionally secured on the projecting end of the sleeve 52 carrying the large paper feed roll and the lower end of the lever is bent upwardly at 110 so that the rod 111' will touch said lever and lift it, thereby moving the paper roll backwardly a very small amount whereby the paper is removed out of contact with the moving knife and is not interfered with thereby for it will be understood that notwithstanding the fact that no paper is fed unless the object has been pushed into the folding carriage that the knife 59 continues to move back and forth with each complete operation of the machine.

The feed table 112 is supported by means of four plates 113, 114, 115 and 116 secured to the top framing of the machine and the position of the object to be wrapped is determined by means of a gage plate 117 immediately in front of the feeding hopper 68, the operator moving the candies or other objects laterally into the proper position to be pushed into the folding carriage by means of the plunger 118. The plate 117 is secured to and is a part of the plate 63. The plunger 118 has a short screw 119 connected therewith which passes through a slot 120 in the plate 112, said slot determining the line of travel of said plunger. The plunger also has a block 121 secured thereto by means of screws 122 and 123 which block has the bar 111 extending therethrough, the ends of said bar being connected to the links 124 and 125, said links in turn being connected to the operating levers 127 and 126, both of which are secured to a rod 128 pivoted in the bottom rails 3 and 7 of the machine. The plunger is also guided by short pins 118'.

The levers 127 and 126 are returned to the position illustrated in the figures by means of springs 129 and 130, which springs are connected with a transversely extending rod 131 supported by the upright members 1 and 5.

The machine is operated from a pulley 132 on a stud 133, a small pinion 134 being in mesh with the large gear 135. The gear 135 is supported by a shaft 136 journaled in bearings 137 and 138 on the frame members 21 and 22. The gear 135' meshes with two other gears 139 and 140 on shafts 142 and 141 respectively. The gears 139 and 140 are rigidly secured to the shafts to which they are attached, but the gear 135' is loose on the shaft 136 and in order to prevent possible injury to the machine said gear is driven by means of a friction clutch composed of the flanged hub 143, two plates 144 and 145 and two screws 146 and 147, said screws 146 and 147 holding the plates 145 and 144 in tight frictional engagement with the flange 148 of the gear 135' and thereby llowing the power transmitting shaft to slip and the delicate parts of the machine to stop if the machine becomes clogged in any way.

The folding carriage comprises an upper and a lower plate 108 and 150. The two plates 150 and 108 are connected by means of two spacing blocks 152 and 153 and two posts 154 and 155 and between which posts and spacing blocks the folding mechanism is slidable through the allowable adjustment.

Depending from the plate 28 are two posts 156 and 157 which posts form the guides for the folding carriage and extend through holes in the plates 150 and 108. The plate 150 has blocks 159 and 158 secured to its lower side through which blocks said posts 156 and 157 also pass. These blocks also provide the pivot points for screws which connect the levers 160 and 161 with the folding carriage, said levers being pivotally connected at their lower ends to levers 162 and 163 supported by a shaft 164 at the rear of the machine. The springs 87 and 88 are connected to the levers 162 and 163 for the purpose of raising the folding carriage in the proper time. The shaft 142 carries two cams 165 and 166, the former of which bears on the roller 100 to operate the knife and bears on another roller 167 carried by a lever 168 to push the partially wrapped parcel out of the folding carriage in the proper time, the upper end of said lever being bent at a right angle to the length thereof at 170 and the lower end being pivoted on a shaft 171, a spring 172 returning the lever to the position indicated in Fig. 6 as soon as the cam 165 releases it. The cam 166 bears on a roller 166' on the lever 164' to depress levers 162, 163, the latter connected by the bar 162'.

The upper carriage plate 108 has an upwardly projecting arm 173 and the lower plate 150 has a small bracket 174 secured thereto which bracket and arm carry a pivoted post 175. The post 175 has a pin 176 at its upper end which projects into the slot 177 of the cam 85. The lower end of the post 175 has an arm 177' secured thereto which arm moves the folding mechanism in accordance with the shape of the cam through a pin 178.

The folding mechanism carried between the plates 108 and 151 comprises a plunger 180 on a guide rod 181 and having a depending pin 182' against which the part 170 contacts to push the parcel out of the folding mechanism. The plate 108 also supports four plates 182, 183, 184 and 185. These plates are right and left hand members and each is a duplicate of the other save for this feature, and each has a flange 186 and a longer flange 187 and each is slotted as indicated at 188. The two lower plates 182 and 185 are slidably connected to the plate 150 by means of large headed screws 189, 190, 191 and 192 and at their outer ends they are rigidly connected by means of a plate 193. The upper plates 183 and 184 are slidably connected to a plate 194, which plate is slidable vertically on the pins 194', 194" and on the spacing blocks 152 and 153 and each plate extends almost into contact with the plate 58 through which the caramel is pushed into the folding mechanism. A spring 194a holds the plate 194 down.

In order to compel the upper and lower members of the folding mechanism to move back and forward in the same time the upper members are slidable on posts 195 and 196 which are rigidly connected with the lower members and with the plate 193. Large headed screws 197, 198, 199 and 200 connect the plates 183 and 184 with the plate 194 and afford the means whereby the plates 183 and 194 are guided in back and forth motion.

Each of the plates 182 to 185 inclusive forms the support for a folding bar, said bars being indicated at 201, 202, 203 and 204. Each of these folding bars is supported by means of a pair of rods 205 and 206, the rods 205 being long enough to go through both of the flanges of the plates 182 to 185 inclusive, while the rods 206 only go through one of the flanges of said plates. The lower folding bars 201 and 204 have outwardly extending horns 208 and 209 secured thereto, which horns touch the paper before the folding bars do and cause it to be partially folded before it comes against the curved surfaces of the ends of the folding bars. When the caramel to be wrapped is pushed forward by the plunger 118 it pushes against the paper and against the plunger 180 which plunger is thereupon moved back into the position shown in Fig. 8, while at that time the folding bars are pushed forwardly to partially fold in the ends of the wrapper. The folding bars 201 to 204 have springs 201', 202', 203' and 204' to hold them against the parcel.

The plunger 180 is operated by means of the pin 182' against which the top of the lever 168 strikes and said pin also operates an arm 210 which is pivoted to the block 159 secured on the bottom of the plate 150 and which has a lug 211 projecting beyond said block to determine the position of the paper feeding hook 212. The hook 212 rises and falls once with each revolution of the shaft 141, but the path of the hook is determined by the wire guide 223 and the lug 211 and the latter will only move to the left, Fig. 2, when a caramel has been pushed into the carriage. When the caramel is pushed into the carriage it takes the paper along with it and a fresh paper is pulled down when the carriage moves down to await the feeding of another caramel. The paper feeding hook is secured to a lever 213 by means of a pair of screws 214 and 215 and by means of which said hook 212 may be adjusted to the proper height to give the desired paper feed. At the lower end the lever 213 is pivoted to a lever 216, which lever is carried by a shaft 217 at the front of the machine. The lever 216 has a portion of its weight carried by a spring 218 and it is operated from a cam 220 on the shaft 141, said cam striking a roller 221 each time the feeding hook is to be depressed. A spring 222 connected with the lever 213 and the lever 216 tends to cause the hook 212 to engage a shoulder on the slide bar 46, but a wire guide 223 on the back of the feeding hook in conjunction with the pin 211 prevents said hook from engaging the slide 46 unless a caramel has been pushed into the folding compartment, so that if the attendant fails to feed the carriage each time it moves up and down there will be no movement of the paper.

When the slide 180 pushes the caramel out of the carriage it is necessary for it to move beyond the edge of the plate 150, whereupon the pin 182 comes in contact with a spring 225 which immediately upon the return of the lever 168 presses the plunger 180 back far enough to insure against its being caught by the plate 55 on the upward movement of the carriage.

Figure 3:
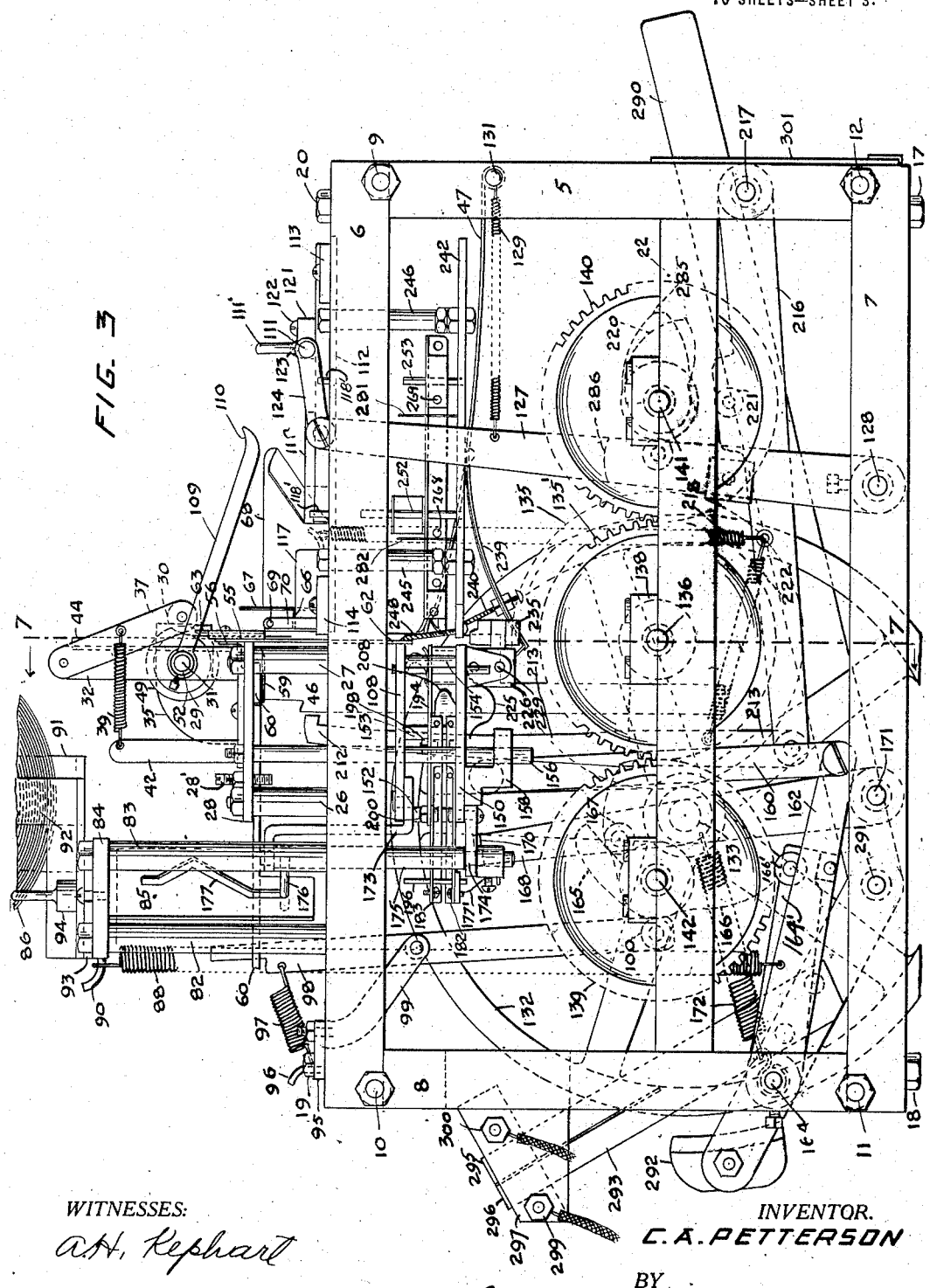
Figure 4:
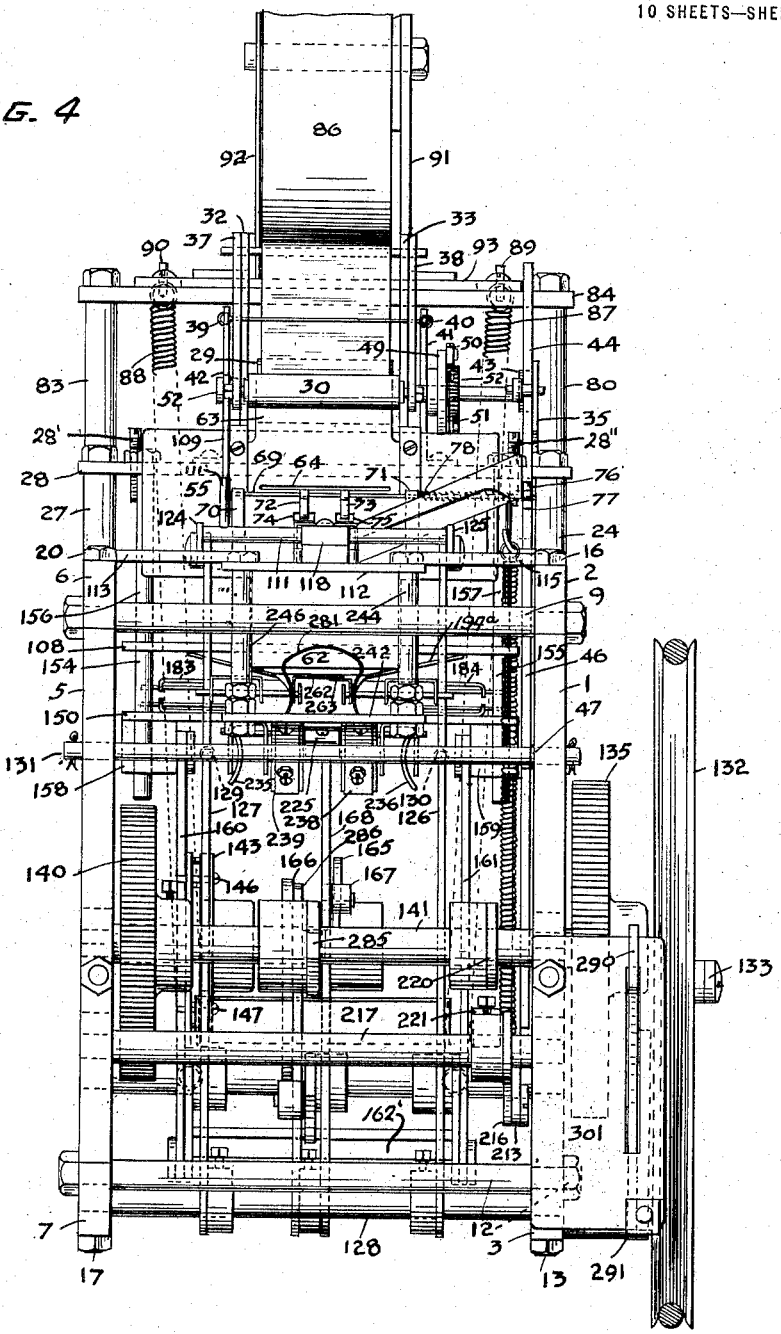
Figure 5:
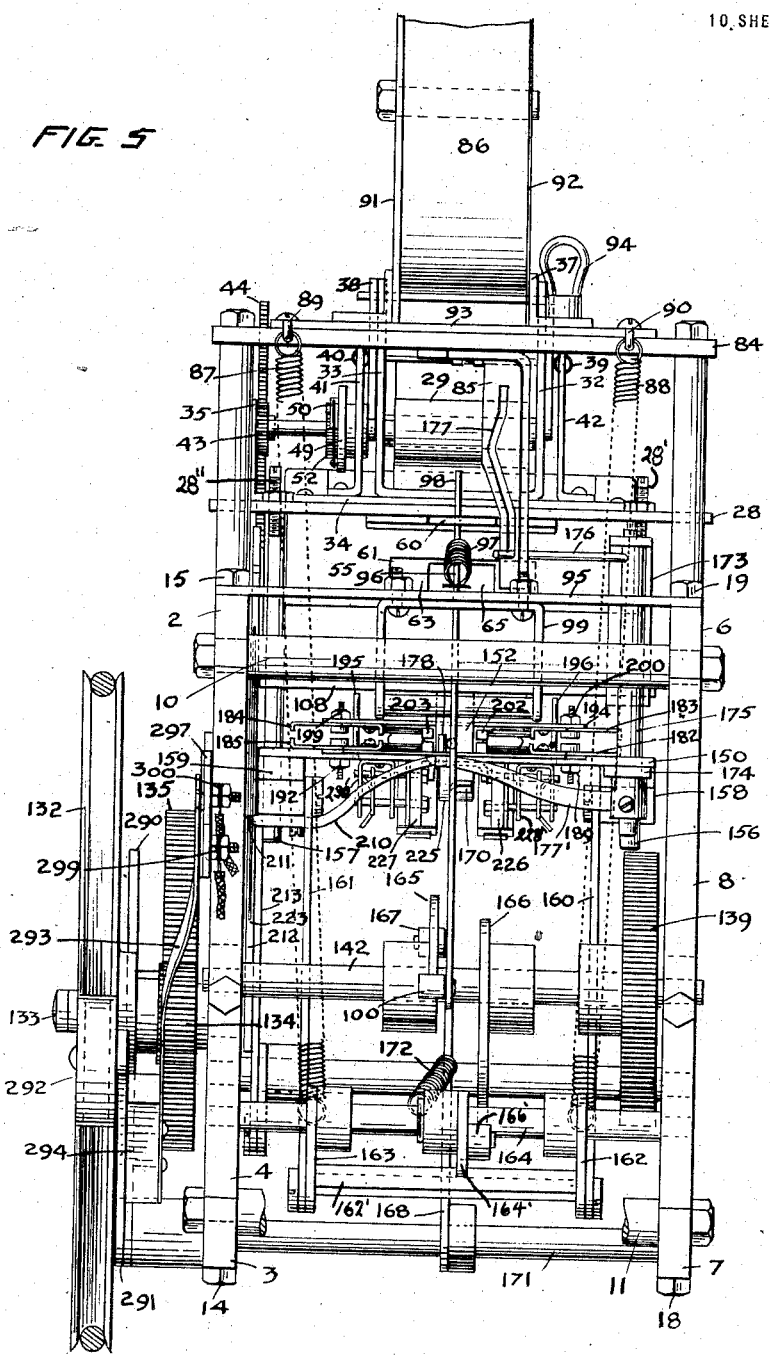

At the front edge of the plate 150 there are two bottom folding plates 226 and 227. These plates are carried respectively by pins 228, 229, 230 and 231 movable in yokes 228' and 230' secured to the bottom of the plate 150. The pins supporting the folding plates carry curved members 235 and 236 respectively, the object of which is to cause the plates to be moved outwardly a small amount thereby insuring the proper upfolding of the bottom of the wrapper. The two plates 226 and 227 are slotted and assume their initial position by gravity, a pair of springs 238 and 239 lifting said plates when the carriage assumes the position shown in Fig. 3, so that the ends of the wrapper are completely folded up across the caramel. Springs 226' and 227' hold said plates against the parcel.

The movable plates 182 to 185 inclusive of the folding carriage are slidably connected with the plate 194, which plate is vertically slidable on two pins 194' and 194" rigidly connected with the plates 150 and 108, and this plate is normally pressed down by means of a spring 194a which bears on the underside of the plate 108 and on the top of the plate 194.

The position of the springs 238 and 239 is determined by the adjusting screws 240 and 241 which screws are fixed in a given position by means of said screws engaging opposite sides of said springs. The springs are supported by means of a plate 242 which is supported below the plate 112 by means of four short posts 243, 244, 245 and 246 and said plate 242 lies in the same plane as the plate 150 when the latter is at the bottom of its movement.

In order to hold the plate 55 in its proper position two screws 248 and 249 extend through the plate 242 and bear against the bottom of the plate 55 thereby bracing it.

The final folding chute is supported upon the plate 242, which plate has four pins 250, 251, 252 and 253 projecting upwardly therefrom, which pins slidably support said chute and permit it to rise and also spread as may be required by the size of candy passing therethrough. The chute comprises two overlapping members having sides 260 and 261, tops 262 and 263 which overlap, and a funnel shaped mouth consisting of the side portion 264, top portion 265 and the other member has a side portion 266 and top portion 267. These members are supported on two pins 268 and 269, and 270 and 271, which pins are slidable to allow the folding members to move laterally and they move in channel irons 273 and 274 which members are slidable upwardly on the posts 250 and 253 inclusive.

At the entrance to the chute, pins 275 275' and 276 276' support two beveled points 277 and 278 respectively on opposite side of the chute. Connected with the points 277 and 278 respectively are rearwardly extending plates 279 and 280, which plates lie within the folding chute and hold the first folds in the proper position to be pressed against the candy by the outside of the folding chute. The two plates 279 and 280 are unsupported save at the pin which supports the folding point which first touches the candy as it is pushed into the chute. Suitable springs 281 and 282 bear upon the sides of the final folding chute to exert the necessary pressure on the ends of the candy to hold the ends of the paper tightly thereto.

The plunger operating levers 126 and 127 are operated by means of a cam 285 on the shaft 141, said cam striking an operating lever 286 connected with the shaft 128.

In order to give the operator convenient control over the machine a lever 290 is pivoted on the base at 291 and carries a brake block 292 and split contact plate 293, a fiber block 294 insulating the plate 293 from the lever. The plate 293 bears on two contact points 295 and 296 carried by a fiber plate 297, and said contact points have binding posts 299 and 300 to which wires leading to the motor for driving the machine are connected. At the operating end the lever 290 passes through a slot in the plate 301 which is bolted to the end of the machine and a spring 303 bearing on the pin 304 carried by the lever holds said lever either in the operative or inoperative position, the brake block 292 coming against the pulley 132 as soon as the motor has been stopped.

The lever 286 is carried by the same shaft as the levers 160 and 161 and a bar 286' connects said levers for the purpose of enabling the lever 286 to move the feed plunger forward.

The operation of the apparatus is as follows: Assuming the paper roll to be full and the paper strip to be passed down into the machine between the paper feed rolls and in front of the feed chute the first operation is for the folding carriage to move up until its plate 150 is on a level with the plane of the horizontal table, whereupon the candy is pushed against the paper A, note Fig. 13, and on to the movable carriage. At the same time the cam slot 177 moves the folding bars 201 to 204 forwardly to form the edge fold B seen in Fig. 14, and while this fold is being effected the carriage is moving down to the position shown in Fig. 3 effecting the second bottom fold C, note Fig. 15. As soon as the edge fold in Fig. 14 has been effected the cam slot 177 moves the folding bars back out of the way so that near the end of the movement of the movable carriage the springs 239 stop the bars 226 and 227 to produce the bottom fold C noted in Fig. 16. These bars remain in position until the lever 168 pushes the plunger and candy forward into the final folding chute whereupon the right hand edge fold D noted in Fig. 17 is made by contact of the paper with the bars 277 and 278.

The plunger must move across on to the plate 242 and consequently the spring 227 is employed to return it to such a position as it will not be interfered with on the return movement of the folding carriage. As successive candies are pushed through the final folding chute the curved portions 264 and 266 turn down the fold along the two upper ends E E, Fig. 17, until they assume the position shown in Fig. 18, which illustrates the completely folded package.

It is to be noted that unless a candy has been pushed against the plunger to move it back the pin 211 will not move to such a position as to allow the hook 212 to feed a fresh length of paper into the machine so that as long as candy is not fed into the machine no paper will be fed either, but as soon as a candy has been pushed in the hook will be allowed to strike the bar 46 and will pull down a new length of paper.

In the production of candy and other package goods it is sometimes desirable to fold the ends of the wrapper over the top of the parcel instead of down on the ends thereof, and such a construction is illustrated in Figs. 19 to 22. In these figures 242$^a$ indicates the plate on which the folding mechanism is mounted, said plate being precisely interchangeable with the plate 242. It has springs 300 and 301 secured to the underside thereof and regulated in position by the screws 302, 303, suitable lock nuts determining the adjustment of the springs, said springs being for the same purpose as the springs 238 on the plate 242.

The folding chute comprises two oppositely placed angle plates 304 and 305 having their ends flared upwardly, outwardly and downwardly as indicated at 306, 307 to form a double plow to lift the unfolded edges upwardly and finally fold them over the top of the parcel. The sides of the angles 304 and 305 have lugs 308, 309 which are let into slots in oppositely placed brackets 310, 311 riveted to the plate 242ª. Springs 312 and 313 riveted to the plate 242ª bear on the lugs 308 and 309 and hold the plates down on the folded package. The angle plate 305 has a top plate 314 secured thereto which overhangs the plate 304 while a spring 315 holds the two angle plates resiliently together.

A flat spring 316 is secured to the plate 304 back of the plate 314 and said spring extends upwardly and forwardly so that its front end, which is bent downwardly supports a plate 317 in such a position as to prevent the package or candy from rising out of the chute, the end thereof being bent upwardly at 318 and having a cross bar 319 secured thereto to turn the edge of the wrapper down before it enters the chute.

In operation the edges of the wrapper are lifted by the parts 306 and 307 and are gradually raised and turned over the top of the plate 317 while being pushed through the chute said folds being indicated at G all of the other folds being the same as the folds previously mentioned.

Having thus described my invention what I claim as new and desire to secure by Letters Patent of the United States, is as follows, modifications within the scope of the claims being expressly reserved:

1. A parcel wrapping machine comprising the combination with a paper supply roll, of a wrapping mechanism, a hook movable in the line of travel of the paper for feeding a fresh length of paper, a guide carried by said hook, a lug extending into proximity to said guide for controlling the movement of said hook, and means operated by the parcel being wrapped to move said lug to shift the hook to feed a fresh length of paper each time a parcel has been pushed into the wrapping mechanism.

2. A parcel wrapping machine comprising the combination with a paper supply roll, of a paper feeding roll, a hook movable in the line of travel of the paper strip for feeding a fresh length of paper, wrapping mechanism, a guide carried by the hook, a lug extending into proximity to the guide and movably mounted on the wrapping mechanism, and means operated by the parcel being wrapped to shift the lug to allow a fresh length of paper to be fed each time a parcel has been pushed into the parcel wrapping mechanism.

3. A parcel wrapping machine comprising the combination with a paper supply roll, of a paper feeding roll, wrapping mechanism, means to sever determinate lengths of the paper as required for the wrapping of the parcel, a hook for operating the paper feeding roll movable in the line of travel of the paper strip, a guide carried by the hook, a lug movably mounted on the wrapping mechanism, and means for shifting said lug to allow the hook to act upon the feeding mechanism to feed a fresh length of paper each time a parcel has been pushed into the wrapping mechanism.

4. A parcel wrapping machine comprising the combination with a paper supply roll, of a paper feed roll, means operated by the parcel being wrapped to set the mechanism feed a fresh strip of paper for the parcel next to be wrapped, means to sever a length of paper from the paper strip, and means to move the paper feed roll backwardly a small amount each time a length of paper is severed from the paper strip.

5. A parcel wrapping machine comprising the combination with a paper supply roll, of a paper feed roll, wrapping mechanism, means to sever lengths of paper from the paper strip, means to hold the severed lengths of paper in a given position in a vertical plane until a fresh parcel has been pushed against the same to begin the wrapping operation, means to feed the paper, and a pair of plates movable over the parcel inlet in the plane of the paper to prevent the paper from getting caught therein.

6. A parcel wrapping machine comprising the combination with a paper supply roll, of a paper feed roll, extensible wrapping mechanism for folding severed strips of paper around parcels of different sizes, a movable hook for operating the feed roll, a lug for guiding said hook, and means whereby the incoming parcel will set said hook for the feed of a fresh length of paper.

7. A parcel wrapping machine comprising the combination with a paper supply roll, a paper feed roll, a parcel wrapping mechanism, means operated by the parcel to set the feed roll to supply a length of paper for the parcel next to be wrapped, and a discharge chute into which the parcel is pushed to effect the final wrapping.

8. A parcel wrapping machine comprising the combination with a paper supply roll, of a paper feed roll, a movable wrapping carriage, extensible wrapping mechanism on said carriage, means operated by the parcel being wrapped to cause the supply roll to furnish an additional length of paper for the parcel next to be wrapped, and an extensible chute into which the parcel is pushed to effect the final wrapping.

9. A parcel wrapping machine comprising the combination with a paper supply of paper feeding mechanism and means to sever the paper into determinate lengths, of a movable wrapping carriage, means operated by the parcel being wrapped to set the paper feeding mechanism to supply an additional length of paper, and a discharge chute into which the parcel is pushed from the movable carriage to effect the final wrapping.

10. A parcel wrapping machine comprising the combination with a paper supply, of paper feed mechanism, means to sever the paper strip into determinate lengths, a movable carriage into which the parcel is pushed, extensible means on said carriage to partially fold the severed paper strip about the parcel at two edges and at the bottom of the parcel, a discharge chute into which the parcel is pushed from the movable carriage, and means in said discharge chute to cause two edges and the two top portions of the wrapper to be folded across the ends of the parcel.

11. A parcel wrapping machine comprising the combination with a paper supply, of a folding carriage, folding bars on said carriage capable of moving laterally and vertically to accommodate themselves to varying sizes of parcels, laterally movable bars to fold the bottom edge of the wrapper upwardly at the ends of the parcel, an extensible discharge chute into which the parcel is pushed for the final folding, and a plunger on the movable carriage for pushing the parcel into said discharge chute.

12. A parcel wrapping machine comprising the combination with a paper supply, of a folding carriage having a longitudinally movable set of bars capable of lateral and vertical movement, laterally movable blocks for folding the bottom edge of the parcel up across the ends of the parcel, a plunger to push the parcel off the movable carriage, an adjustable discharge chute having means for folding the two edges of the wrapper across the ends of the parcel and for folding the upper edges of the wrapper across the ends of the parcel.

13. A parcel wrapping machine comprising a paper supply, paper feed rolls, a plate having an opening therethrough, a movable carriage carrying folding mechanism, means to present said carriage to the opening in said plate, and pivoted guards movable in the plane of the paper to prevent the paper from passing through the opening in said plate when the paper is being advanced.

14. In a parcel wrapping machine, a paper supply roll, paper feed rolls, a plate having an opening therethrough, a folding carriage adapted to be presented to said opening and carrying folding mechanism, a pivoted guard at each side of the opening in said plate, and means carried by the guard to contact with the folding carriage to lift the guards away from the opening in said plate to permit the paper and the parcel to be pushed therethrough.

In testimony whereof I have hereunto set my hand this 25" day of March A. D. 1915, in the presence of the two subscribed witnesses.

CLARENCE A. PETTERSON

Witnesses:
C. P. GRIFFIN,
N. SCHILLER.